(12) United States Patent
Zhao et al.

(10) Patent No.: US 11,906,838 B2
(45) Date of Patent: Feb. 20, 2024

(54) DISPLAY MODULE, METHOD OF MANUFACTURING THE SAME, AND DISPLAY DEVICE

(71) Applicant: BOE Technology Group Co., Ltd., Beijing (CN)

(72) Inventors: Dejiang Zhao, Beijing (CN); Lu Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 115 days.

(21) Appl. No.: 17/770,262

(22) PCT Filed: Jun. 15, 2021

(86) PCT No.: PCT/CN2021/100055
§ 371 (c)(1),
(2) Date: Apr. 19, 2022

(87) PCT Pub. No.: WO2021/254316
PCT Pub. Date: Dec. 23, 2021

(65) Prior Publication Data
US 2022/0390795 A1   Dec. 8, 2022

(30) Foreign Application Priority Data
Jun. 17, 2020 (CN) .......................... 202010552854.6

(51) Int. Cl.
*G02F 1/1335* (2006.01)
*G02F 1/1333* (2006.01)

(52) U.S. Cl.
CPC .. *G02F 1/133524* (2013.01); *G02F 1/133377* (2013.01); *G02F 1/133512* (2013.01); *G02F 1/133614* (2021.01)

(58) Field of Classification Search
None
See application file for complete search history.

(56) References Cited

U.S. PATENT DOCUMENTS

2017/0031205 A1  2/2017 Lee
2017/0329175 A1* 11/2017 Lee ................... G02F 1/133345
(Continued)

FOREIGN PATENT DOCUMENTS

CN  102768433 A  11/2012
CN  106405918 A   2/2017
(Continued)

OTHER PUBLICATIONS

PCT/CN2021/100055 international search report and written opinion.

*Primary Examiner* — Phu Vu
(74) *Attorney, Agent, or Firm* — IPro, PLLC

(57) ABSTRACT

A display module, a method of manufacturing the same, and a display device are provided. The display module comprises: a light guide plate; a blue light source, disposed at the light entering face of the light guide plate; and a display panel, disposed at a side of the light exiting face of the light guide plate, the display panel comprises a plurality of display units, and adjacent display units are spaced apart with a light shielding barrier wall; each display unit comprises a quantum dot unit and a liquid crystal unit arranged side by side, and the liquid crystal unit and the quantum dot unit are spaced apart with a transparent barrier wall; a side of the liquid crystal unit away from the light guide plate is provided with a first light shielding pattern.

20 Claims, 3 Drawing Sheets

(56) References Cited

U.S. PATENT DOCUMENTS

2019/0361293 A1    11/2019  Hong et al.
2021/0223627 A1*  7/2021  Nam ................ G02F 1/133614

FOREIGN PATENT DOCUMENTS

| CN | 107065063 A | 8/2017 |
| CN | 111048693 A | 4/2020 |
| CN | 111580307 A | 8/2020 |

* cited by examiner

DISPLAY MODULE, METHOD OF MANUFACTURING THE SAME, AND DISPLAY DEVICE

CROSS REFERENCE TO RELATED APPLICATION

The present application is the U.S. national phase of PCT Application No. PCT/CN2021/100055 filed on Jun. 15, 2021, which claims priority to Chinese Patent Application No. 202010552854.6, filed in China on Jun. 17, 2020, which is incorporated herein by reference in its entirety.

TECHNICAL FIELD

The present application relates to the field of displaying technology, and in particular, to a display module and a method of manufacturing the same, and a display device.

BACKGROUND

With the continuous development of QD (quantum dot) material, QD display product is widely used. Currently, the QD display product adopts two techniques, one is electroluminescence QD technique and the other is photoluminescence QD technique. A conventional photoluminescence technique is to excite QD material through blue light. The blue light has a greater energy due to its shorter wavelength, so that the use of the blue light with shorter wavelength to excite QD material can obtain a better utilization of exciting light. However, the blue light with shorter wavelength can easily penetrate the display module, be incident on human eyes and injure human eyes.

SUMMARY

In one aspect, a display module is provided, comprising:
a light guide plate, the light guide plate comprising a light entering face and a light exiting face adjacent to each other;
a blue light source, disposed at the light entering face of the light guide plate; and
a display panel, disposed at a side of the light exiting face of the light guide plate;
wherein the display panel comprises a plurality of display units and a light shielding barrier wall which separates adjacent display units; each of the plurality of display units comprises a quantum dot unit, a liquid crystal unit, a transparent barrier wall and a first light shielding pattern, the quantum dot unit and the liquid crystal unit are arranged in parallel with each other along a lateral direction, the transparent barrier wall separates the liquid crystal unit from the quantum dot unit, and the first light shielding pattern is arranged at a side of the liquid crystal unit away from the light guide plate; an orthographic projection of the liquid crystal unit onto the light guide plate is located within an orthographic projection of the first light shielding pattern onto the light guide plate, and an orthographic projection of the quantum dot unit onto the light guide plate overlaps with an orthographic projection of a gap between adjacent first light shielding patterns onto the light guide plate.

In some embodiments, the display panel further comprises:
a light propagation direction changing structure, arranged at a side of the liquid crystal unit facing towards the light guide plate, the light propagation direction changing structure is configured to deflect an incoming vertical light.

In some embodiments, the display panel further comprises:
a passivation layer, located between the light propagation direction changing structure and the liquid crystal unit; and
a driving electrode located between the passivation layer and the liquid crystal unit for driving the deflection of the liquid crystal in the liquid crystal unit;
wherein a refractive index of the light propagation direction changing structure is greater than a refractive index of the passivation layer, the refractive index of the passivation layer is greater than a refractive index of the driving electrode, and the refractive index of the driving electrode is greater than a refractive index of the liquid crystal.

In some embodiments, the light propagation direction changing structure comprises a plurality of wedge structures arranged in parallel, the wedge structures having a height of 1.5 um to 3 um.

In some embodiments, a plurality of second light shielding patterns arranged at intervals is disposed at the light exiting face of the light guide plate, the orthographic projection of the quantum dot unit onto the light guide plate is located within an orthographic projection of a corresponding second light shielding pattern onto the light guide plate, and the orthographic projection of the liquid crystal unit onto the light guide plate overlaps with an orthographic projection of a gap between adjacent second light shielding patterns onto the light guide plate.

In some embodiments, an orthographic projection of the transparent barrier wall onto the light guide plate is located within the orthographic projection of the corresponding second light shielding pattern onto the light guide plate.

In some embodiments, the orthographic projection of the transparent barrier wall onto the light guide plate is located within the orthographic projection of the first light shielding pattern onto the light guide plate.

In some embodiments, a thickness of the first light shielding pattern is 1.5 μm to 2 μm.

In some embodiments, wavelength of the light emitted by the blue light source is less than 410 nm.

In some embodiments, a weight percentage of scattering particles within the quantum dot unit is 1% to 5%.

In some embodiments, in each display unit, the quantum dot unit and the liquid crystal unit arranged in parallel with each other along a lateral direction, and the transparent barrier wall are surrounded by the light shielding barrier wall.

In some embodiments, in each display unit, the first light shielding pattern covers the side of the liquid crystal unit away from the light guide plate and a side of the transparent barrier wall away from the light guide plate.

Embodiments of the present application provide a display device, comprising the display module as described above.

In some embodiments, the display device also includes a processor. The processor is configured to adjust an angle of the deflection of the liquid crystal to adjust a luminous intensity of the quantum dot unit by controlling a voltage applied to the liquid crystal unit via the driving electrode.

Embodiments of the present application provide a method for manufacturing a display module, comprising:
providing a light guide plate, wherein the light guide plate comprises a light entering face and a light exiting face adjacent to each other;

forming a blue light source at the light entering face of the light guide plate; and forming a display panel at a side of the light exiting face of the light guide plate, wherein the display panel comprises a plurality of display units, and adjacent display units are separated by a light shielding barrier wall; each display unit of the plurality of display units comprises a quantum dot unit and a liquid crystal unit arranged in parallel with each other along a lateral direction, the liquid crystal unit and the quantum dot unit are separated by a transparent barrier wall, a first light shielding pattern is disposed at a side of the liquid crystal unit away from the light guide plate, and an orthographic projection of the liquid crystal unit onto the light guide plate is located within an orthographic projection of the first light shielding pattern onto the light guide plate.

Figure 1:
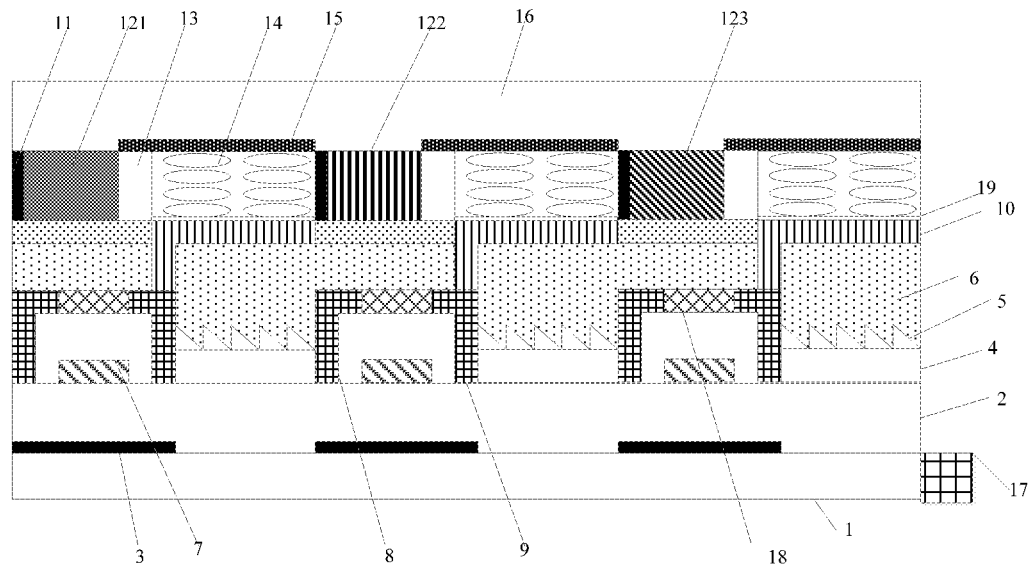
FIG. 1 is a schematic diagram of a display module according to embodiments of the present application.

REFERENCE NUMERALS 1 light guide plate
2, 16 base substrate
3 second light shielding pattern
4 gate insulating layer
5 light propagation direction changing structure
6 passivation layer
7 gate electrode
8 source electrode
9 drain electrode
10 driving electrode
11 light shielding barrier wall
121 red quantum dot unit
122 green quantum dot unit
123 blue quantum dot unit
13 transparent barrier wall
14 liquid crystal unit
15 first light shielding pattern
17 blue light source
18 active layer
19 alignment layer

DETAILED DESCRIPTION

In order to make the technical issue to be addressed, the technical solution and advantages according to embodiments of the present application more clearly, a detailed description will be given below in conjunction with the drawings and specific embodiments.

Embodiments of the present application provide a display module and a method of manufacturing the same, and a display device, which can improve an utilization rate of exciting light and reduce damage to eyes due to the blue light.

As shown in FIG. 1, embodiments of the present application provide a display module, comprising:

a light guide plate 1, the light guide plate comprising a light entering face and a light exiting face which are adjacent to each other;

a blue light source 17, disposed at the light entering face of the light guide plate; and a display panel, disposed at a side of the light exiting face of the light guide plate 1, wherein the display panel comprises a plurality of display units, and an light shielding barrier wall 11 is provided between adjacent display units for separating them; each of the display units comprises a quantum dot unit and a liquid crystal unit 14 arranged in parallel with each other along a lateral direction, and a transparent barrier wall 13 is provided between the liquid crystal unit 14 and the quantum dot unit for separating them; a first light shielding pattern 15 is disposed at a side of the liquid crystal unit 14 away from the light guide plate 1; an orthographic projection of the liquid crystal unit 14 onto the light guide plate 1 is located within an orthographic projection of the first light shielding pattern 15 onto the light guide plate 1, and an orthographic projection of the quantum dot unit onto the light guide plate 1 with an orthographic projection of a gap onto the light guide plate 1, the gap is between adjacent first light shielding patterns 15.

In this embodiment, the exciting light emitted by blue light source enters from the side face of light guide plate, and exits through the light exiting face of light guide plate. Compared with an optical path for the exciting light that enters in vertical direction (perpendicular to the light exiting face), an optical path for the exciting light that enters in a lateral direction (parallel to the light exiting face) is longer and enough, which can improve an utilization rate of the exciting light. After the exciting light exits through the light exiting face of light guide plate and enters the liquid crystal unit of the display panel, the exciting light may enter the quantum dot unit through a deflection of the liquid crystal and excite the quantum dot unit to emit light. The first light shielding pattern is provided at a side of the liquid crystal unit away from the light guide plate, and can absorb the exciting light which does not enter the quantum dot unit, so as to prevent the exciting light from exiting the liquid crystal unit to cause a damage to human eyes. In addition, a light shielding barrier wall is provided between adjacent display units to absorb light passing through the quantum dot unit laterally, thereby avoiding an interference due to light leakage.

The quantum dot unit may comprise a plurality of quantum dot units in different colors, and the quantum dot units in different colors emit lights in different colors by the excitation of the blue light, and the lights be mixed into a white light. As shown in FIG. 1, the quantum dot unit of this embodiment may include a red quantum dot unit 121, a green quantum dot unit 122, and a blue quantum dot unit 123.

In this embodiment, a display unit may correspond to a pixel. The area of the first light shielding pattern 15 may be greater than the area of a corresponding liquid crystal unit 14, the first light shielding pattern 15 extends to a region for the transparent barrier wall 13. This is mainly for preventing the exciting light from exiting through the liquid crystal unit 14, and a black photoresist material or a grey reflective material may be used for the first light shielding pattern 15, the thickness of which is about 1.5 μm to 2 μm.

Figure 5:
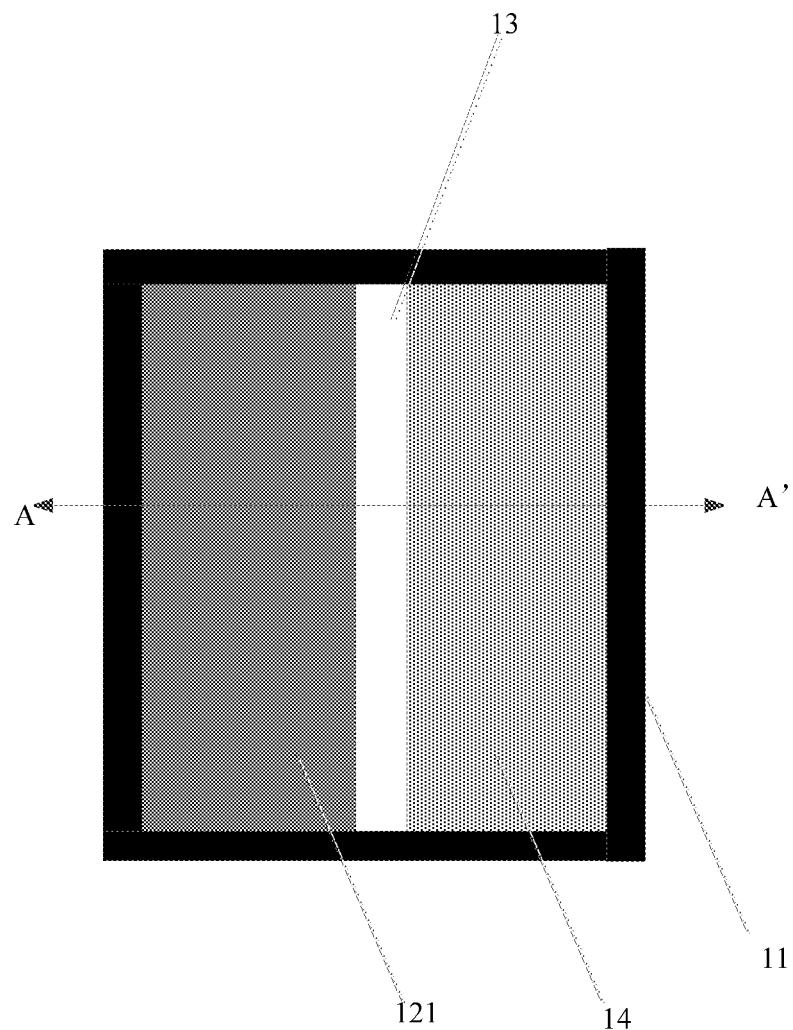
FIG. 5 is a schematic plane view of a display unit.

FIG. 5 is a schematic top view of the display unit, and FIG. 1 is a schematic cross-sectional view of FIG. 5 on an AA' direction. It can be seen that the display unit is surrounded by a light shielding barrier wall 11 on four sides, and the display unit comprise a quantum dot unit and a liquid crystal unit 14, a transparent barrier wall 13 is provided between the quantum dot unit and the liquid crystal unit 14 for separating them. The light shielding barrier wall 11 surrounds three sides of the liquid crystal unit 14, and the light shielding barrier wall 11 is not provided at one side where the light exited from the liquid crystal unit 14 enters the quantum dot unit, a thickness of the light shielding barrier wall 11 is equal to a thickness for the cell of the display panel, the thickness may be 2 μm to 3 μm. A black photoresist material or a grey reflective material may be used for the light shielding barrier wall 11, while a transparent resin, such as AGC 5023 (acrylic type), may be used for transparent barrier wall 13. A thickness of transparent barrier wall 13 is equal to the thickness for the cell of the display panel, the thickness may can be 2 μm to 3 μm.

The quantum dot unit can be made of PR type QD material, a thickness of the material is about 2 μm to 3 μm. The quantum dot unit may be obtained by means of adhesive coating and then being subjected to exposure, or by means of printing. A content of scattering particles in the quantum dot unit of this embodiment can be reduced compared with the quantum dot unit in the related art. This is because an optical path of the exciting light for the quantum dot unit in the related art is equivalent to the thickness of the quantum dot unit, while an optical path of the exciting light for the quantum dot unit of this embodiment is equivalent to the width or the length of the quantum dot unit as the exciting light enters the quantum dot unit in the lateral direction. The width or the length of the quantum dot unit is greater than the thickness of the quantum dot unit, so that the optical path of the exciting light is greatly improved. In addition, a powerful light source with sufficient exciting capability may be used as the exciting light source, and thus the content of scattering particles can be reduced. If the content of scattering particles is great, it will lead to a side leakage of the blue light and block the light propagation. This will also result in a difficulty for manufacturing the quantum dot unit, because the existence of a large number of scattering particles makes it difficult to produce the quantum dot unit by printing, as it is easy to cause nozzle blockage. In this embodiment, the weight percentage of scattering particles in the quantum dot unit can be reduced to 1% to 5%.

As shown in FIG. 1, the transparent barrier wall 13 and the light shielding barrier wall 11 define a pixel region at which the liquid crystal unit 14 is located, and the liquid crystal may be dropped into the pixel region to form the liquid crystal unit 14.

As shown in FIG. 1, the display module comprises a light guide plate 1, a blue light source 17 arranged at a light entering face of the light guide plate 1. The exciting light emitted by the blue light source 17 enters the light guide plate, and is incident on the display panel through a light exiting face of the light guide plate. The blue light source 17 may adopt a blue LED, and the wavelength of the light emitted by the blue light source 17 may be less than 410 nm, for example, 395 nm, in such cases, an absorbance of the blue light by the quantum dot unit is relatively high. Alternatively, the light emitted by the blue light source 17 may also be in other wave band, such as in a 460 nm band.

If the light exited from the light guide plate 1 directly enters the quantum dot unit, part of the light may pass through the quantum dot unit and be incident on human eyes, resulting in a light leakage which may cause a damage to the human eyes. To avoid this, as shown in FIG. 1, a plurality of second light shielding patterns 3 arranged at intervals is disposed at the light exiting face of the light guide plate 1. An orthographic projection of the quantum dot unit onto the light guide plate is located within an orthographic projection of a second light shielding pattern 3 onto the light guide plate, and an orthographic projection of the liquid crystal unit 14 onto the light guide plate overlaps with an orthographic projection of a gap, which is between adjacent second light shielding patterns 3, onto the light guide plate. Alternatively, the orthographic projection of the quantum dot unit onto the light guide plate coincides with the orthographic projection of the second light shielding pattern 3 onto the light guide plate, and the orthographic projection of the liquid crystal unit 14 onto the light guide plate coincides with the orthographic projection of the gap between the adjacent second light shielding pattern 3 onto the light guide plate. Thus, the light exited from light guide plate 1 can only enter the liquid crystal unit 14, but cannot enter the quantum dot unit.

As shown in FIG. 1, a thin-film transistor structure is provided on the base substrate 2; the thin-film transistor comprises a gate electrode 7, a gate insulating layer 4, an active layer 18, a source electrode 8 and a drain electrode 9. An orthographic projection of the thin-film transistor onto the light guide plate 1 is located within the orthographic projection of the second light shielding pattern 3 onto the light guide plate, so that the light exited from the light guide plate 1 may also be prevented from being incident on the thin-film transistor structure, which may affect the performance of the thin-film transistor.

If the light exiting from the light guide plate 1 directly enters the liquid crystal layer, the light parallel to the light guide plate 1 may be reduced in a case that the deflection angle of the liquid crystal is not large enough. The effective light applied to the quantum dot unit may also be reduced, and a corresponding display brightness may be reduced. in order to improve the utilization rate of the exciting light, as shown in FIG. 1, the display panel further comprises:

a light propagation direction changing structure 5, arranged at a side of the liquid crystal unit 14 facing towards the light guide plate 1, and the light propagation direction changing structure is configured to deflect an incoming vertical light. The light exited from the light guide plate 1 may be deflected by the light propagation direction changing structure 5, and more light may be reflected by the liquid crystal unit and then applied to the quantum dot unit, so that the utilization rate of the exciting light and thus the display brightness can be improved.

As shown in FIG. 1, the light propagation direction changing structure 5 can be disposed only at a location opposite to the liquid crystal unit 14, and the light propagation direction changing structure 5 may be made of a transparent dielectric layer having a relatively good refractive index. In some embodiments, the light propagation direction changing structure 5 may comprise a plurality of wedge structures arranged in parallel, the wedge structures each has a height of 1.5 um to 3 um. The light propagation direction changing structure 5 is not limited to shaped as the wedge structure, but may also be adjusted on the basis of wedge structures. Here, an oblique angle of the wedge structure needs to be adjusted according to the refractive index of the wedge structure to cause the incoming vertical light to be deflected.

As shown in FIG. 1, the display panel further comprises:
a passivation layer 6, located between the light propagation direction changing structure 5 and the liquid crystal unit 14;
a driving electrode 10, located between the passivation layer 6 and the liquid crystal unit 14 and the driving electrode is configured for driving a deflection of the liquid crystal in the liquid crystal unit.

A refractive index of the light propagation direction changing structure 5 is greater than a refractive index of the passivation layer 6, the refractive index of the passivation layer 6 is greater than a refractive index of the driving electrode 10, and the refractive index of the driving electrode 10 is greater than a refractive index of the liquid crystal. In this manner, the incoming vertical light can be deflected effectively.

The liquid crystal unit 14 further comprises an alignment layer 19 in addition to the liquid crystal. Since the thickness of the liquid crystal layer is relatively small, which is in the range of 2 um to 3 um, the alignment layer 19 may be provided as a monolayer so as to simplify the structure of the liquid crystal unit, and polyimide may be used for the alignment layer 19.

Figure 2:
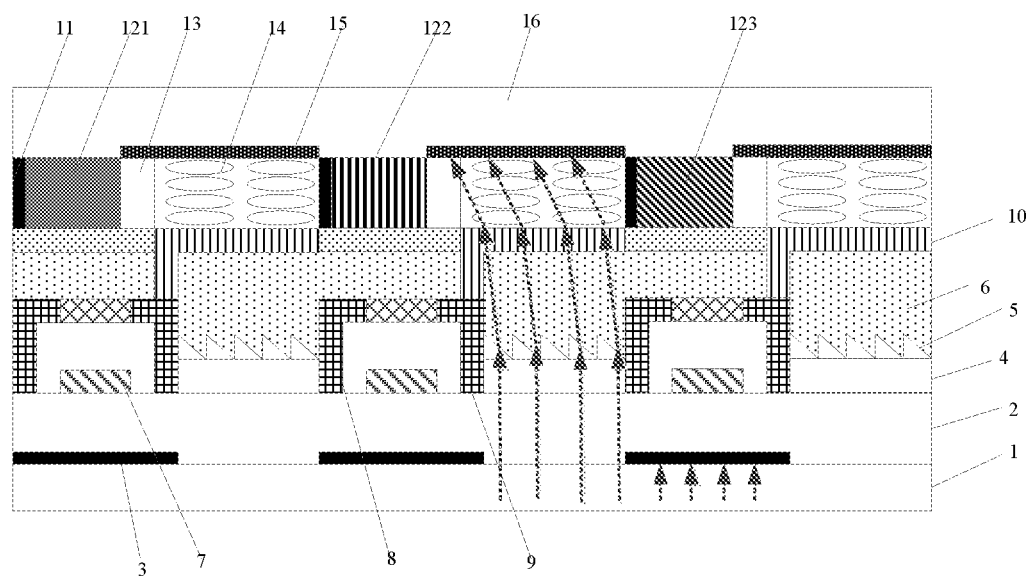
FIG. 2 is a schematic diagram of an optical path when the liquid crystal is not deflected according to embodiments of the present application.
Figure 3:
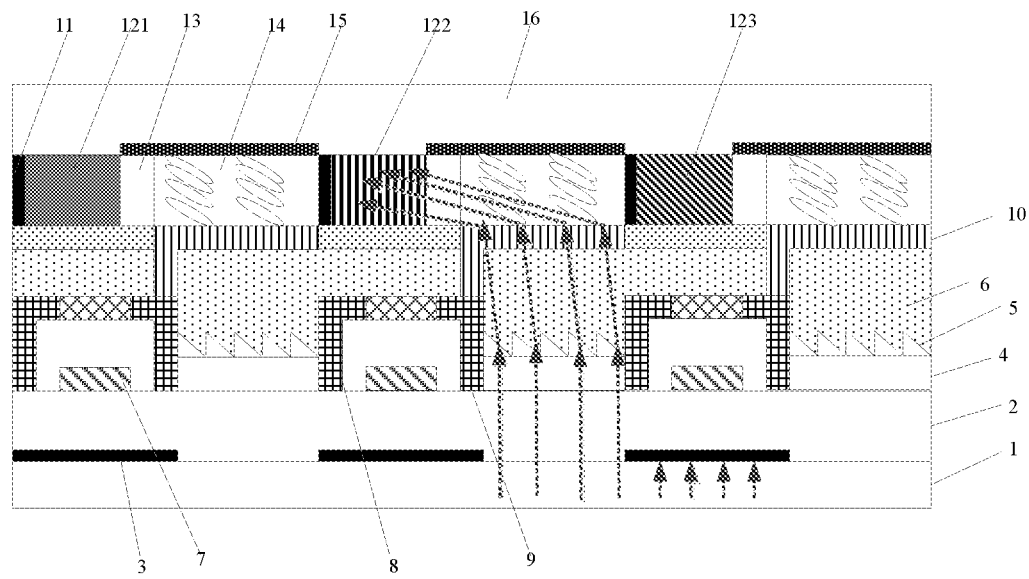
FIG. 3 is a schematic diagram of an optical path when the liquid crystal is deflected according to embodiments of the present application.
Figure 4:
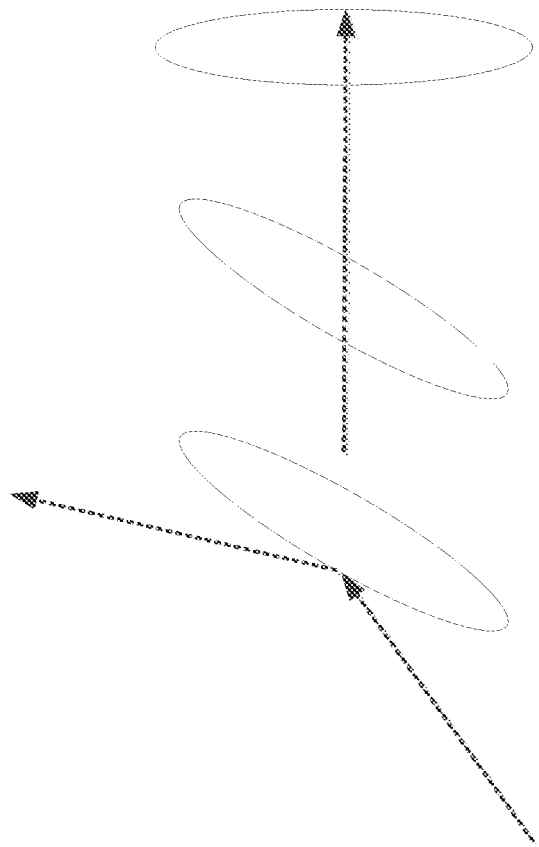
FIG. 4 is a schematic diagram showing how an optical path is changed by the liquid crystal.

FIG. 2 is a schematic diagram of an optical path when a liquid crystal is not deflected according to embodiments of the present application. FIG. 3 is a schematic diagram of an optical path when the liquid crystal is deflected according to embodiments of the present application. FIG. 4 is a schematic diagram showing how an optical path is changed by the liquid crystal. As shown in FIG. 4, there are two extreme states for the liquid crystal, one may be referred to as a normal state and the other may be referred to as a fully deflected state. In the normal state, the light is refracted by the liquid crystal, and a deflection angle for the light passing through the liquid crystal is small. As shown in FIG. 2, the light exited from the light guide plate 1 enters the display panel, and then is absorbed by the first light shielding pattern 15. In case of an exciting state, a total reflection of the light occurs at the surface of the liquid crystal, the optical path is changed, and the light whose optical path has been changed may excite the quantum dot unit. As shown in FIG. 3, after the light exited from the light guide plate 1 enters the display panel, the optical path of the light is changed, so that the light enters the quantum dot unit. The light whose optical path has not been changed sufficiently can be absorbed by the first light shielding pattern 15 and the light shielding barrier wall 11, such that a side leakage can be avoided.

As shown in FIG. 4, when the applied voltage is insufficient, the deflection angle of the liquid crystal is insufficient, resulting in a reduced amount of light in a parallel direction, and thus a reduced amount of active light for exciting the quantum dot unit. As a result, the corresponding display brightness may be low. When the voltage increases, the deflection angle becomes large, and the total reflection occurs, resulting in an increased amount of the active light for exciting the quantum dot unit. Thus, the luminance illuminated by the pixel can be adjusted, by controlling the voltage applied to the liquid crystal unit 14.

Embodiments of the present application provide a display device, comprising the display module as described above.

The display device includes, but is not limited to: a radio frequency unit, a network module, an audio output unit, an input unit, a sensor, a display unit, a user input unit, an interface unit, a memory, a processor, a power source and the like. It will be appreciated by those skilled in the art that the structure of the display device described above is not intended to limit the display device. The display device may include more or less components than those as described above, or some of the components may be combined, or the components may be in a different arrangement. In embodiments of the present application, the display device includes, but is not limited to, a displayer, a mobile phone, a tablet computer, a television, a wearable electronic device, a navigation display device, etc.

The display device may be any product or component with a display function such as a television, a displayer, a digital photo frame, a mobile phone and a tablet computer. The display device may further comprises a flexible circuit board, a printed circuit board and a backplate.

Embodiments of the present application provide a method for manufacturing a display module, comprising:
providing a light guide plate, wherein the light guide plate comprises a light entering face and a light exiting face that are adjacent to each other;
forming a blue light source at the light entering face of the light guide plate; and
forming a display panel at a side of the light exiting face of the light guide plate, wherein the display panel comprises a plurality of display units, and adjacent display units are spaced apart by a light shielding barrier wall, each display unit comprises a quantum dot unit and a liquid crystal unit that are arranged in parallel with each other along a lateral direction, the liquid crystal unit and the quantum dot unit are spaced apart by a transparent barrier wall, a first light shielding pattern is disposed at a side of the liquid crystal unit away from the light guide plate, and an orthographic projection of the liquid crystal unit onto the light guide plate is located within an orthographic projection of the first light shielding pattern onto the light guide plate.

In this embodiment, the exciting light emitted by blue light source enters from the side face of light guide plate, and exits through the light exiting face of light guide plate. Compared with the exciting light enters in a vertical direction (perpendicular to the light exiting face), the exciting light enters in a lateral direction (parallel to the light exiting face) has a longer optical path, and an utilization rate of the exciting light can be improved by enough optical path. After the exciting light exits through the light exiting face of light guide plate and then enters the liquid crystal unit of display panel, the exciting light may be deflected by the liquid crystal, so as to enter the quantum dot unit and excite the quantum dot unit to emit light. A first light shielding pattern is provided at a side of the liquid crystal unit away from the light guide plate, which can absorb the exciting light not entering the quantum dot unit, so as to prevent the exciting light from exiting the liquid crystal unit to cause damage to human eyes. In addition, a light shielding barrier wall is disposed between adjacent display units to absorb the light passing through the quantum dot unit laterally, so as to prevent an occurrence of interference due to light leakage.

In manufacturing the display module, a lower substrate may be fabricated first, a thin-film transistor structure is formed on a base substrate 2, where the thin-film transistor structure comprises a gate electrode 7, a gate insulating layer 4, a source electrode 8, a drain electrode 9 and an active layer 18. Then, a passivation layer 6 comprising via hole(s) is formed, a driving electrode 10 is formed on the passivation layer 6, and the driving electrode 10 is connected to the drain electrode 9 by the via hole(s) of the passivation layer 6. An alignment layer 19 is then formed on the driving electrode 10. In order not to affect the entrance of light, a transparent material may be used for the passivation layer and the driving electrode. It should be noted that after forming the gate insulating layer 4, a light propagation direction changing structure 5 needs to be fabricated before the passivation layer 6 is fabricated.

Subsequently, an upper substrate may be fabricated. A first light shielding pattern 15, a light shielding barrier wall 11 and a transparent barrier wall 13 are formed on a base substrate 16, and the light shielding barrier wall 11 and the transparent barrier wall 13 define a region where the quantum dot unit is located and a region where the liquid crystal unit is located. The light shielding barrier wall 11 and the transparent barrier wall 13 may limit the flow of the quantum dot and the liquid crystal on the one hand, and may also support the thickness of the cells on the other hand. The light shielding barrier wall 11 and the transparent barrier wall 13 may be fabricated by printing.

A quantum dot material is printed in the region where the quantum dot unit is located, which region is defined by the light shielding barrier wall 11 and the transparent barrier wall, and the quantum dot material is cured to form the quantum dot unit. A liquid crystal material is printed in the region where the liquid crystal unit is located, which region is defined by the light shielding barrier wall 11 and the transparent barrier wall 13, so as to form the liquid crystal unit.

Afterwards the upper substrate and the lower substrate are cell-aligned, and then a light guide plate with a second light shielding pattern 3 fabricated thereon is attached to the lower substrate to end the manufacturing of the display module.

It should be noted that various embodiments in this specification is described in a progressive manner, the same and similar parts between variation embodiment can be referred to each other, and each embodiment focuses on the difference from other embodiments. In particular, for the method embodiments, since they are substantially similar to the product embodiments, the description thereof is relatively simple, and the relevant part can refer to the description of the product embodiments.

Unless defined otherwise, technical or scientific terms used in the present disclosure shall have the ordinary meaning as understood by one of ordinary skills in the art to which the present disclosure belongs. The use of "first", "second", and the like in the present disclosure does not denote any order, quantity, or importance, but rather is used to distinguish one element from another. The word "comprise" or "include", and the like, means that the presence of an element or item preceding the word encompasses the presence of the element or item listed after the word and equivalents thereof, but does not exclude other elements or items. The words "connect" or "couple" and the like are not limited to a physical connection or a mechanical connection, but may include an electrical connection, whether direct or indirect. The terms such as "upper", "lower", "left", "right" are used only to indicate a relative position relationship, which may change accordingly when the absolute position of the object being described changes.

It should be understood that when an element such as a layer, film, region, or substrate is referred to as being "on" or "under" another element, such an element may be "directly on" or "directly under" the other element or intervening elements may be present.

In the above description of the embodiments, particular features, structures, material or characteristics may be combined in any suitable manner in any one or more of the embodiments or examples.

The above description is only specific implementations of the present disclosure, but the protection range of the present disclosure is not limited thereto, and any changes or substitutions, which would have readily conceived by a person skilled in the art who is familiar with the technical field after reading the technical solution disclosed in the present disclosure, fall within the protection scope of the present disclosure. Accordingly, the protection scope of the present disclosure is set forth in the appended claims.

What is claimed is:

1. A display module, comprising:
   a light guide plate, the light guide plate comprising a light entering face and a light exiting face adjacent to each other;
   a blue light source, disposed at the light entering face of the light guide plate; and
   a display panel, disposed at a side of the light exiting face of the light guide plate;
   wherein the display panel comprises a plurality of display units and a light shielding barrier wall which separates adjacent display units; each of the plurality of display units comprises a quantum dot unit, a liquid crystal unit, a transparent barrier wall and a first light shielding pattern, the quantum dot unit and the liquid crystal unit are arranged in parallel with each other along a lateral direction, the transparent barrier wall separates the liquid crystal unit from the quantum dot unit, and the first light shielding pattern is arranged at a side of the liquid crystal unit away from the light guide plate; an orthographic projection of the liquid crystal unit onto the light guide plate is located within an orthographic projection of the first light shielding pattern onto the light guide plate, and an orthographic projection of the quantum dot unit onto the light guide plate overlaps with an orthographic projection of a gap between adjacent first light shielding patterns onto the light guide plate.

2. The display module according to claim 1, wherein the display panel further comprises:
   a light propagation direction changing structure, arranged at a side of the liquid crystal unit facing towards the light guide plate, the light propagation direction changing structure is configured to deflect an incoming vertical light.

3. The display module according to claim 2, wherein the display panel further comprises:
   a passivation layer, located between the light propagation direction changing structure and the liquid crystal unit; and
   a driving electrode, located between the passivation layer and the liquid crystal unit and the driving electrode being configured to drive a deflection of liquid crystal in the liquid crystal unit;
   wherein a refractive index of the light propagation direction changing structure is greater than a refractive index of the passivation layer, the refractive index of the passivation layer is greater than a refractive index of the driving electrode, and the refractive index of the driving electrode is greater than a refractive index of the liquid crystal.

4. The display module according to claim 2, wherein the light propagation direction changing structure comprises a plurality of wedge structures arranged in parallel, the plurality of wedge structure each has a height of 1.5 μm to 3 μm.

5. The display module according to claim 1, wherein,
   a plurality of second light shielding patterns arranged at intervals is disposed at the light exiting face of the light guide plate, the orthographic projection of the quantum dot unit onto the light guide plate is located within an orthographic projection of a corresponding second light shielding pattern onto the light guide plate, and the orthographic projection of the liquid crystal unit onto the light guide plate overlaps with an orthographic projection of a gap between adjacent second light shielding patterns onto the light guide plate.

6. The display module according to claim 5, wherein an orthographic projection of the transparent barrier wall onto the light guide plate is located within the orthographic projection of the corresponding second light shielding pattern onto the light guide plate.

7. The display module according to claim 6, wherein the orthographic projection of the transparent barrier wall onto the light guide plate is located within the orthographic projection of the first light shielding pattern onto the light guide plate.

8. The display module according to claim 1, wherein a thickness of the first light shielding pattern is 1.5 µm to 2 µm.

9. The display module according to claim 1, wherein a wavelength of light emitted by the blue light source is less than 410 nm.

10. The display module according to claim 1, wherein a weight percentage of scattering particles in the quantum dot unit is 1% to 5%.

11. The display module according to claim 1, wherein in each of the plurality of display units, the quantum dot unit and the liquid crystal unit arranged in parallel with each other along a lateral direction, and the transparent barrier wall are surrounded by the light shielding barrier wall.

12. The display module according to claim 11, wherein in each of the plurality of display units, the first light shielding pattern covers the side of the liquid crystal unit away from the light guide plate and a side of the transparent barrier wall away from the light guide plate.

13. A display device, comprising a display module, wherein the display module comprises:
a light guide plate, wherein the light guide plate comprises a light entering face and a light exiting face adjacent to each other;
a blue light source, disposed at the light entering face of the light guide plate; and
a display panel, disposed at a side of the light exiting face of the light guide plate;
wherein the display panel comprises a plurality of display units and a light shielding barrier wall which separates adjacent display units; each of the plurality of display units comprises a quantum dot unit, a liquid crystal unit, a transparent barrier wall and a first light shielding pattern, the quantum dot unit and the liquid crystal unit are arranged in parallel with each other along a lateral direction, the transparent barrier wall separates the liquid crystal unit from the quantum dot unit, and the first light shielding pattern is arranged at a side of the liquid crystal unit away from the light guide plate; an orthographic projection of the liquid crystal unit onto the light guide plate is located within an orthographic projection of the first light shielding pattern onto the light guide plate, and an orthographic projection of the quantum dot unit onto the light guide plate overlaps with an orthographic projection of a gap between adjacent first light shielding patterns onto the light guide plate.

14. The display device according to claim 13, wherein the display panel further comprises:
a light propagation direction changing structure, arranged at a side of the liquid crystal unit facing towards the light guide plate, the light propagation direction changing structure being configured to deflect an incoming vertical light.

15. The display device according to claim 14, wherein the display panel further comprises:
a passivation layer, located between the light propagation direction changing structure and the liquid crystal unit;
a driving electrode, located between the passivation layer and the liquid crystal unit, the driving electrode being configured to drive a deflection of liquid crystal in the liquid crystal unit;
wherein a refractive index of the light propagation direction changing structure is greater than a refractive index of the passivation layer, the refractive index of the passivation layer is greater than a refractive index of the driving electrode, and the refractive index of the driving electrode is greater than a refractive index of the liquid crystal.

16. The display device according to claim 15, further comprising a processor;
wherein the processor is configured to adjust an angle of the deflection of the liquid crystal to adjust a luminous intensity of the quantum dot unit by controlling a voltage applied to the liquid crystal unit via the driving electrode.

17. A method for manufacturing a display module, comprising:
providing a light guide plate, wherein the light guide plate comprises a light entering face and a light exiting face adjacent to each other;
forming a blue light source at the light entering face of the light guide plate; and
forming a display panel at a side of the light exiting face of the light guide plate, wherein the display panel comprises a plurality of display units, and adjacent display units are separated by a light shielding barrier wall; each display unit of the plurality of display units comprises a quantum dot unit and a liquid crystal unit arranged in parallel with each other along a lateral direction, the liquid crystal unit and the quantum dot unit are separated by a transparent barrier wall, a first light shielding pattern is disposed at a side of the liquid crystal unit away from the light guide plate, and an orthographic projection of the liquid crystal unit onto the light guide plate is located within an orthographic projection of the first light shielding pattern onto the light guide plate.

18. The display device according to claim 13, wherein,
a plurality of second light shielding patterns arranged at intervals is disposed at the light exiting face of the light guide plate, the orthographic projection of the quantum dot unit onto the light guide plate is located within an orthographic projection of a corresponding second light shielding pattern onto the light guide plate, and the orthographic projection of the liquid crystal unit onto the light guide plate overlaps with an orthographic projection of a gap between adjacent second light shielding patterns onto the light guide plate.

19. The display device according to claim 18, wherein an orthographic projection of the transparent barrier wall onto the light guide plate is located within the orthographic projection of the corresponding second light shielding pattern onto the light guide plate.

20. The display device according to claim 13, wherein in each of the plurality of display units, the quantum dot unit and the liquid crystal unit arranged in parallel with each other along a lateral direction, and the transparent barrier wall are surrounded by the light shielding barrier wall.

\* \* \* \* \*